US012290205B2

(12) United States Patent
Godlove et al.

(10) Patent No.: US 12,290,205 B2
(45) Date of Patent: May 6, 2025

(54) FOOD WARMING CONTAINER

(71) Applicants: Richard Godlove, Frostburg, MD (US); Amy Denise Godlove, Frostburg, MD (US)

(72) Inventors: Richard Godlove, Frostburg, MD (US); Amy Denise Godlove, Frostburg, MD (US)

( * ) Notice: Subject to any disclaimer, the term of this patent is extended or adjusted under 35 U.S.C. 154(b) by 802 days.

(21) Appl. No.: 17/169,841

(22) Filed: Feb. 8, 2021

(65) Prior Publication Data

US 2021/0378444 A1 Dec. 9, 2021

Related U.S. Application Data

(60) Provisional application No. 63/035,101, filed on Jun. 5, 2020.

(51) Int. Cl.
*A47J 36/24* (2006.01)
*A47J 43/24* (2006.01)
*A47J 43/28* (2006.01)

(52) U.S. Cl.
CPC ........... *A47J 36/2405* (2013.01); *A47J 43/24* (2013.01); *A47J 43/283* (2013.01); *A47J 36/2438* (2013.01)

(58) Field of Classification Search
CPC ...... A47J 36/2405; A47J 43/24; A47J 43/283; A47J 36/2438; A47J 36/24; A47J 43/28; D06M 11/74; D06M 11/79; D06M 13/395; D06M 15/263; D06M 15/285; D06M 15/3562; D06M 15/693; D06M 2101/06; D06M 2101/08; D06M 2101/32; D06M 2101/34; D06M 2101/36; D06M 101/06; D06M 101/08; D06M 101/32;

(Continued)

(56) References Cited

U.S. PATENT DOCUMENTS 646,734 A * 4/1900 Hansen ................ A47G 21/004
222/131
2,086,475 A * 7/1937 Powell .................... A47J 36/20
99/403

(Continued)

FOREIGN PATENT DOCUMENTS

GB 300462 A * 11/1928 ............... A47B 3/10

OTHER PUBLICATIONS

U.S. Food & Drug Administration, Serving Up Safe Buffets, Feb. 17, 2022, https://www.fda.gov/food/buy-store-serve-safe-food/serving-safe-buffets#:~:text=Hot%20foods%20should%20be%20kept,slow%20cookers%2C%20and%20warming%20trays. (Year: 2022).*

(Continued)

*Primary Examiner* — Brian W Jennison
*Assistant Examiner* — Adam M Eckardt
(74) *Attorney, Agent, or Firm* — Boudwin Intellectual Property Law, LLC; Daniel Boudwin

(57) ABSTRACT

A food warming device is shown and described. The food warming device includes a container having a base and at least one sidewall rising therefrom creating an interior volume. A removable lid section is secured to the end of the at least one sidewall opposite the base wherein the base, the at least one sidewall, and the removable lid include an insulative property. The interior volume of the container is partially filled with a volume of hot liquid. A handle is secured to the at least one sidewall adjacent to the removable lid.

10 Claims, 5 Drawing Sheets

(58) Field of Classification Search
CPC .. D06M 101/34; D06M 101/36; D06M 15/29;
D06M 15/356
See application file for complete search history.

(56) References Cited

U.S. PATENT DOCUMENTS

| | | | | |
|---|---|---|---|---|
| 2,864,645 | A * | 12/1958 | Roy | A47G 21/10 |
| | | | | D7/686 |
| 4,540,611 | A * | 9/1985 | Henderson | B65D 23/08 |
| | | | | 428/36.5 |
| 5,319,937 | A | 6/1994 | Fritsch et al. | |
| 5,890,613 | A * | 4/1999 | Williams | A45C 7/0045 |
| | | | | 220/23.4 |
| 6,575,155 | B2 | 6/2003 | Brennan | |
| 7,178,673 | B1 | 2/2007 | Miller | |
| 8,746,498 | B2 * | 6/2014 | Maldonado | A45F 5/02 |
| | | | | 220/756 |
| 2004/0262319 | A1 | 12/2004 | Fisher | |
| 2011/0203297 | A1 | 8/2011 | Oberweis | |
| 2017/0108260 | A1 | 4/2017 | Ansted et al. | |
| 2022/0105527 | A1 * | 4/2022 | Angeletta | B65D 47/2068 |

OTHER PUBLICATIONS

U.S. Food & Drug Administration, Serving Up Safe Buffets, Feb. 17, 2022, https://www.fda.gov/food/buy-store-serve-safe-food/serving-safe-buffets#:~:text=Hot%20foods%20should%20be%20kept,slow%20cookers%2C%20and% (Year: 2022).*

* cited by examiner

FOOD WARMING CONTAINER

CROSS REFERENCE TO RELATED APPLICATIONS

This application claims the benefit of U.S. Provisional Application No. 63/035,101 filed on Jun. 5, 2020. The above identified patent application is herein incorporated by reference in its entirety to provide continuity of disclosure.

BACKGROUND OF THE INVENTION

The present invention relates to food warming devices. More particularly, the present invention provides a food warming device that keeps food warm without a connected power source.

Many individuals enjoy tailgating, picnicking, or spending time outdoors away from the comforts of home. Many of these activities include eating warm foods. One of these comforts includes the ability to easily warm or cook food. In many of these instances it can be difficult for individuals to cook or warm foods during such activities due to the lack of amenities.

Often, individuals forego hot food at such events because the hassle of transporting such food is too great. Alternatively, the users can transport food items to be cooked at the location, however such cooking apparatuses may not be readily available. If a user attempts to transport a cooked food item without proper temperature control, the food item may drop to an unsafe temperature allowing bacteria to accumulate, potentially risking the health of anyone consuming such food.

Consequently, there is a need for an improvement in the art of food carrying and warming devices. The present invention substantially diverges in design elements from the known art while at the same time solves a problem many people face when wanting to transport and consume warm food without cooking the same immediately prior to consumption. In this regard the present invention substantially fulfills these needs.

SUMMARY OF THE INVENTION

The present invention provides a food warming device wherein the same can be utilized for providing convenience for the user when transporting and consuming warm food items. The food warming device is comprised of a container having a base and at least one sidewall rising therefrom creating an interior volume. A removable lid section is secured to the end of the at least one sidewall opposite the base, wherein the base, the at least one sidewall, and the removable lid include an insulative property. A handle is secured to the at least one sidewall adjacent to the removable lid.

Another object of the food warming device is to have the interior volume of the container be partially filled with a volume of hot liquid.

Another object of the food warming device is to have a removable portion secured to the base of the container opposite the at least one sidewall.

Another object of the food warming device is to have a removable portion with a slot therein.

Another object of the food warming device is to have a handle which has a collapsible hook secured thereto.

Another object of the food warming device is to have at least one condiment container removably secured within the handle.

Another object of the food warming device is to have a colander placed within the interior volume of the container.

Another object of the food warming device is to have a pair of exterior side compartments secured to the exterior of the at least one sidewall.

Another object of the food warming device is to have a container 101 that may have a hotdog shape or the like and the pair of exterior side compartments 106 may have a bun shape or the like.

Another object of the food warming device is to have a pair of tongs secured to the interior side of the removable lid.

Another object of the food warming device is to have the hot liquid at a temperature of at least 180 degrees Fahrenheit.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
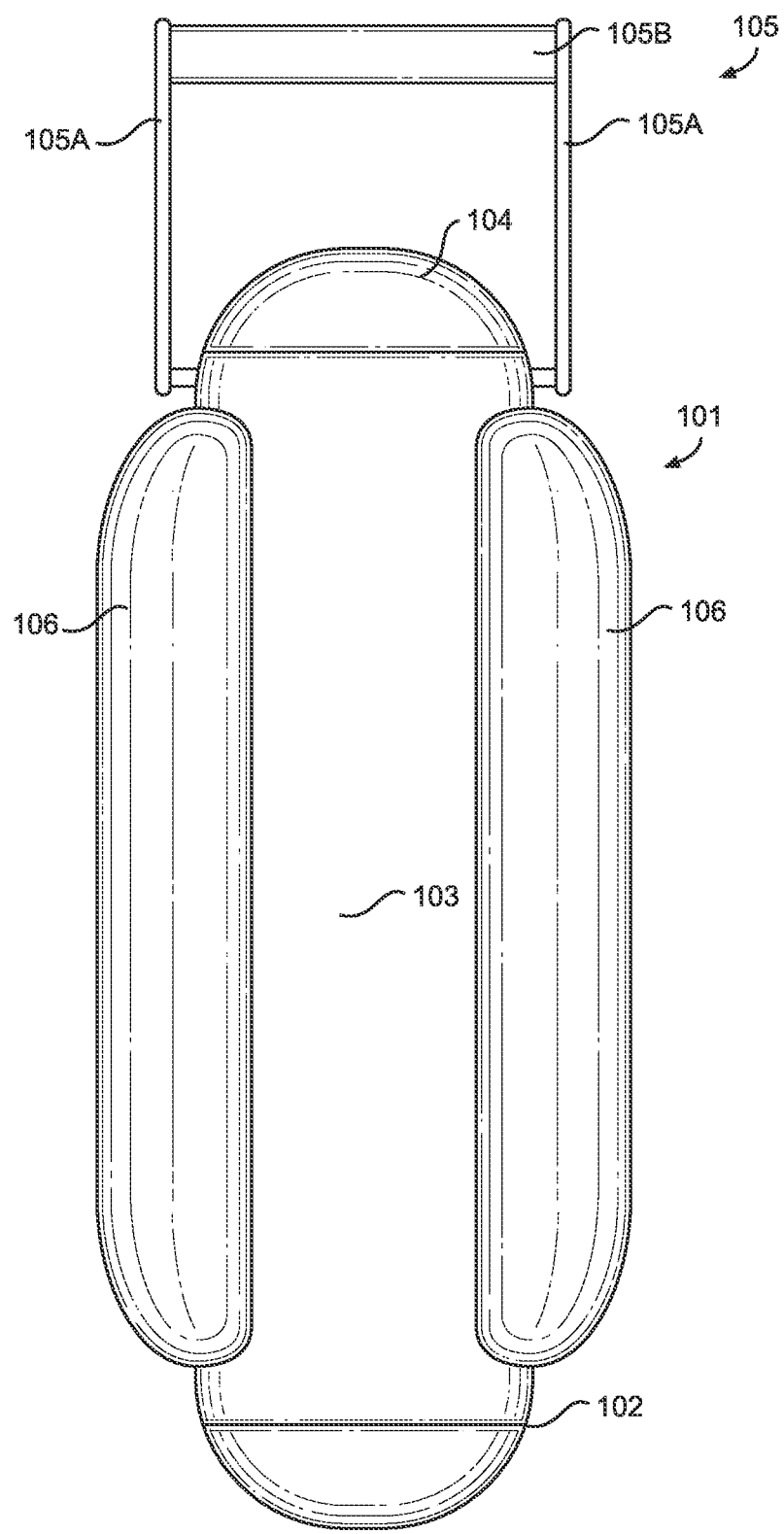
FIG. 1 shows a front view of an embodiment the food warming device.

With regard to the reference numerals used, the following numbering is used throughout the drawings.
101 Container
102 Base
103 At least one sidewall
104 Lid
105 Handle
105A Side bars
105B Grasping portion
106 Side compartments
201 Threads
202 Threads
203 Insulation
204 Water
205 Tongs
206 Colander
206A Base
206B Apertures
206C Handle
301 Hinges
302 Colored protrusion
401 Compartment
402 End cap
403 Threads
404 Slot
405 Gasket
406 Stack of plates 501 Hook
502 Condiment containers

DETAILED DESCRIPTION OF THE INVENTION

Reference is made herein to the attached drawings. Like reference numerals are used throughout the drawings to depict like or similar elements of the food warming device. For the purposes of presenting a brief and clear description of the present invention, a preferred embodiment will be discussed as used for the food warming device. The figures are intended for representative purposes only and should not be considered to be limiting in any respect.

Referring now to FIG. 1, there is shown a front view of an embodiment the food warming device. The food warming device is comprised of a container 101. The container 101 includes a base 102 having at least one sidewall 103 rising therefrom. In one embodiment the container 101 is a cylinder shape. In another embodiment the container 101 is oval shaped. These shapes will allow the container 101 to represent a food item. A removable lid 104 is removably secured to an end of the at least one sidewall 103 opposite the base 102. In one embodiment, the removable lid 104 is attached to the at least one sidewall 103 via a series of threads. In another embodiment, the removable lid 104 is secured to the at least one sidewall 103 via a friction fit.

In many embodiments, the food warming device includes a handle 105 connected to the at least one sidewall 103. The handle 105 is connected to the at least one sidewall 103 at a position below and adjacent to the removable lid 104. The handle 105 is comprised of a pair of side bars 105A and a grasping section 105B. In one embodiment, the grasping section 105B has a hollow interior, this will be further described in the description of FIG. 5. In one embodiment, the handle 105 is connected to the at least one sidewall 103 such that it may rotate.

The food warming container further includes a pair of side compartments 106. The pair of side compartments 106 are secured to the container 101 such that they protrude from the at least one sidewall 103. The pair of side compartments 106 will be discussed in further detail throughout the specification. In one embodiment, the pair of side compartments 106 and the container 101 resemble a hotdog on a bun. The container 101 may have a hotdog shape or the like and the pair of exterior side compartments 106 may have a bun shape or the like.

Figure 2:
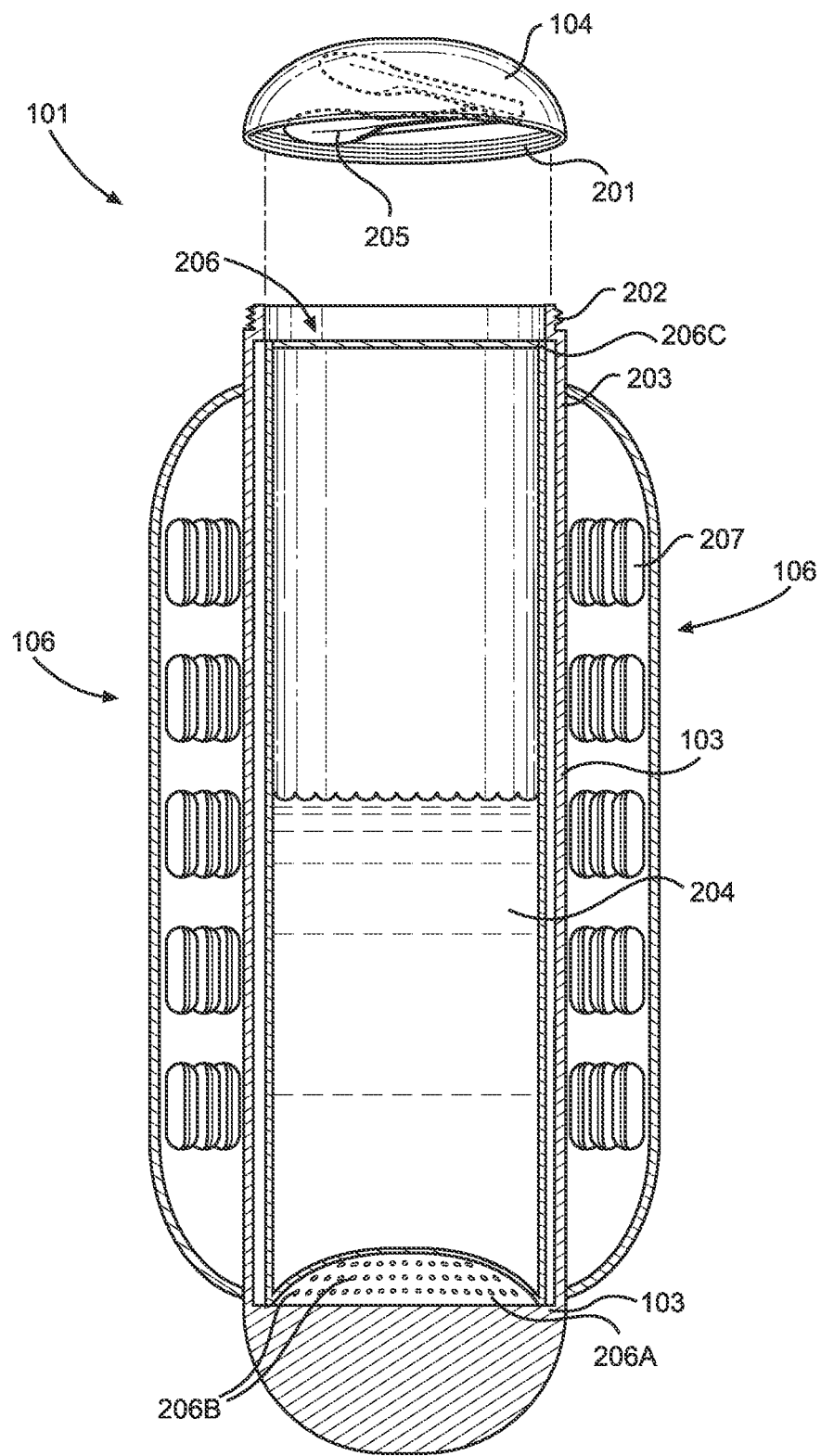
FIG. 2 shows a cross-sectional view of an embodiment of the food warming device.

Referring now to FIG. 2, there is shown a cross-sectional view of an embodiment of the food warming device. From this image there can be seen threads 201 located within the removable lid 104. The threads 201 on the removable lid 104 will mesh with threads 202 on the exterior of the at least one sidewall 103, This will allow the removable lid 104 to be threaded onto the at least one sidewall 103. This connection will create a waterproof seal between the removable lid 104 and the at least one sidewall 103

The container 101 has insulation 203 located within the base 102, the at least one sidewall 103 and the removable lid 104. The insulation 203 will ensure that items placed within the container 101 stay at a desired temperature longer. Further, the insulation 203 will prevent the exterior of the container 101 from reaching high or low temperatures that match the interior of the container 101.

In use, water 204 is placed within the container 101. The temperature of the water 204 will be risen or lowered to a desired temperature via an external source. In one embodiment, the temperature of the water 204 is risen to over one hundred eighty (180) degrees Fahrenheit. In other embodiments, the temperature of the water 204 is higher. This will allow for items to be cooked or kept at an elevated temperature when placed in the water 204.

In one embodiment, the underside of the removable lid 104 has a pair of tongs 205 secured therein. The tongs 205 will allow individuals to safely remove items from the high temperature water 204 as described above. In another embodiment, the container has a colander 206 placed therein. The colander 206 is comprised of a base 206A. The base 206A includes a plurality of apertures 206B to better allow water 204 to drain through the base 206A. The colander 206 further includes a handle 206C secured to the base 206A. The handle 206C includes a pair of elongated rods and a grasping portion. The elongated rods allow for a user to remove the colander 206 from the water retrieving the food inside the container without reaching into the water.

The side compartments 106 have an interior volume which will allow for the storing of various items therein. One of the pair of side compartments 106 is shown to have several hotdog buns 207 therein. This will allow for the food warming device to include various necessary and complimenting items to the food to be warmed.

Figure 3:
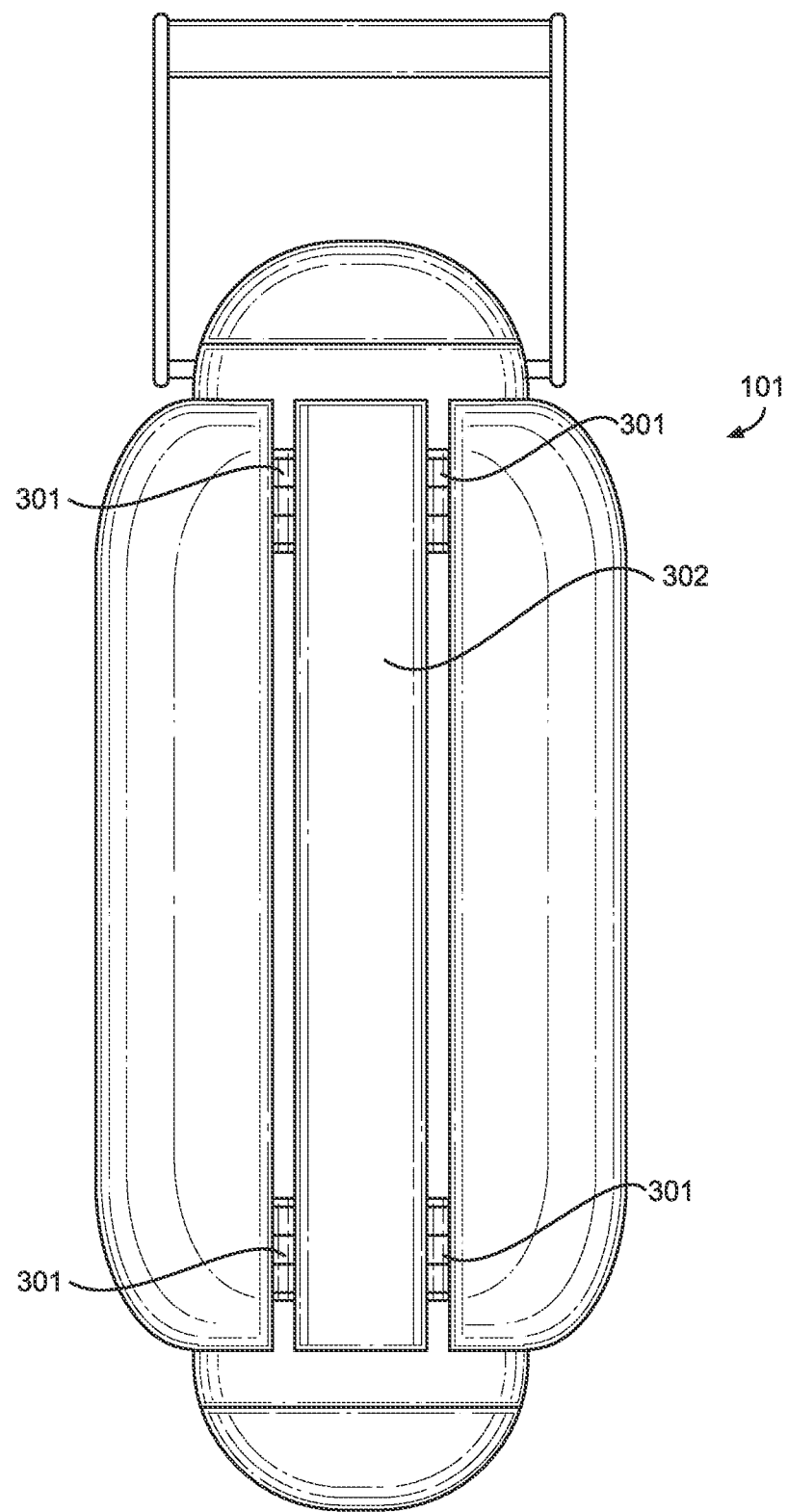
FIG. 3 shows a rear view of an embodiment of the food warming device.

Referring now to FIG. 3, there is shown a rear view of an embodiment of the food warming device. In one embodiment, the pair of side compartments 106 are movably secured to the container 101. In one embodiment, each of the pair of side compartments 106 are secured to the container via hinges 301. This will allow the side compartments to be opened and closed. In some embodiments there is a similarly colored protrusion 302 secured along the container 101. The similarly colored protrusion 302 will be of the same or similar color to the pair of side compartments 106. This will better capture the pair of side compartments 106 appearance of a hotdog bun. In one embodiment, the similarly colored protrusions 302 will cover the hinges 301.

Figure 4:
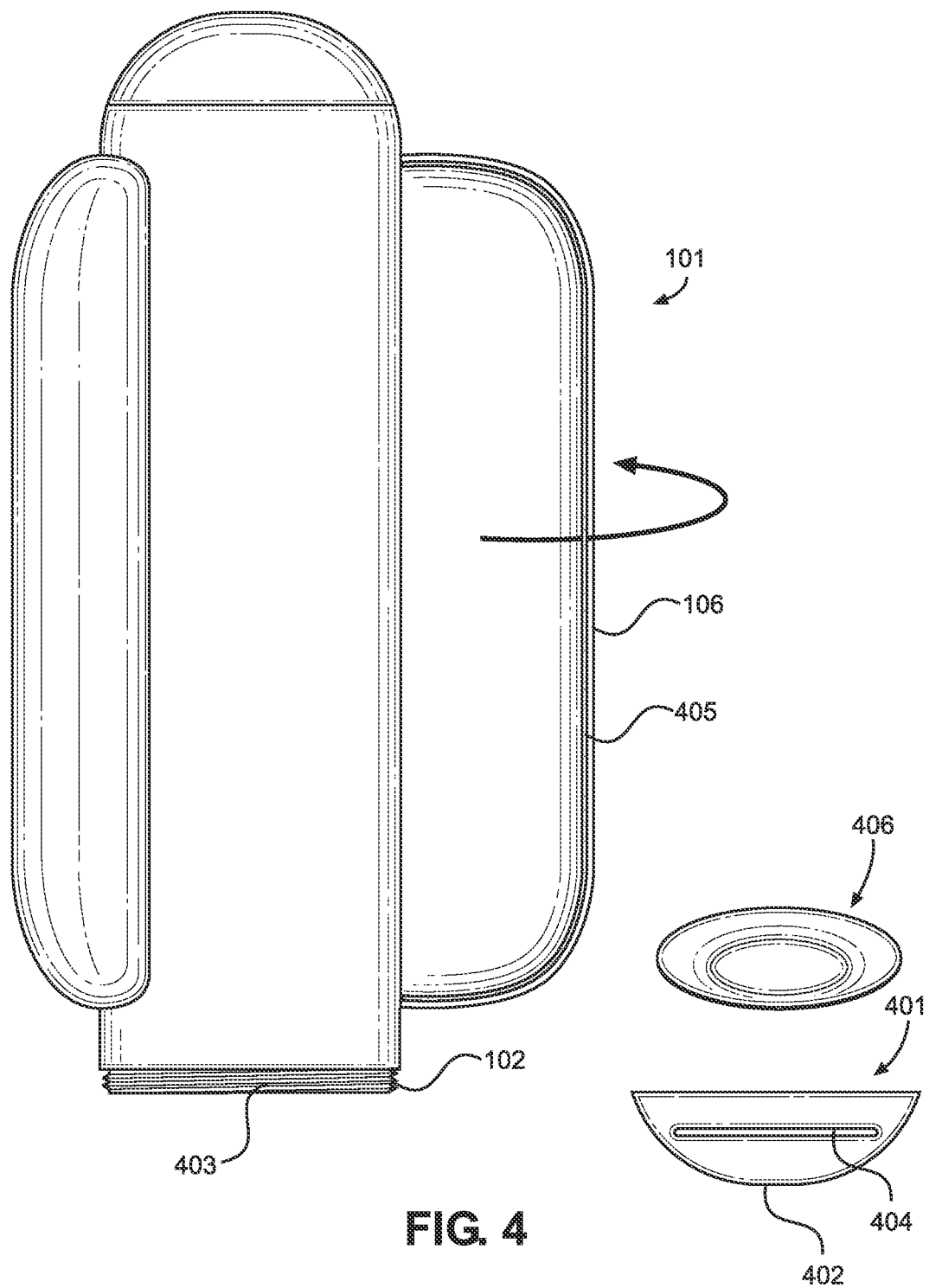
FIG. 4 shows a perspective view of an embodiment of the food warming device.

Referring now to FIG. 4, there is shown a perspective view of an embodiment of the food warming device. In one embodiment, there is a secondary compartment 401 removably secured to the base 102 of the container 101. The secondary container 401 is comprised of a removable end cap 402. In one embodiment the removable end cap 402 is hingedly secured to the base 102 of the container 101. In the shown embodiment there are complementary threads 403 shown on the exterior of the base 102. In one embodiment the secondary container 401 will hold a stack of plates 406. In one embodiment the end cap 402 includes a slot 404. In one embodiment the slot 404 will allow for a plate to be removed from the secondary compartment 401 without having to remove the end cap 402.

In one embodiment, each of the pair of side compartments 106 is secured closed via a friction fit. In one embodiment, each of the pair of side compartments 106 includes a rubber gasket 405 secured around the perimeter of the side compartment 106. In one embodiment, this will create a waterproof seal when the side compartment 106 is sealed closed. In another embodiment, the rubber gasket 405 will further help to create the friction needed to seal the container. It is contemplated as part of this disclosure that other sealing devices and methods may be used to hold each of the pair of side compartments 106 closed.

Figure 5:
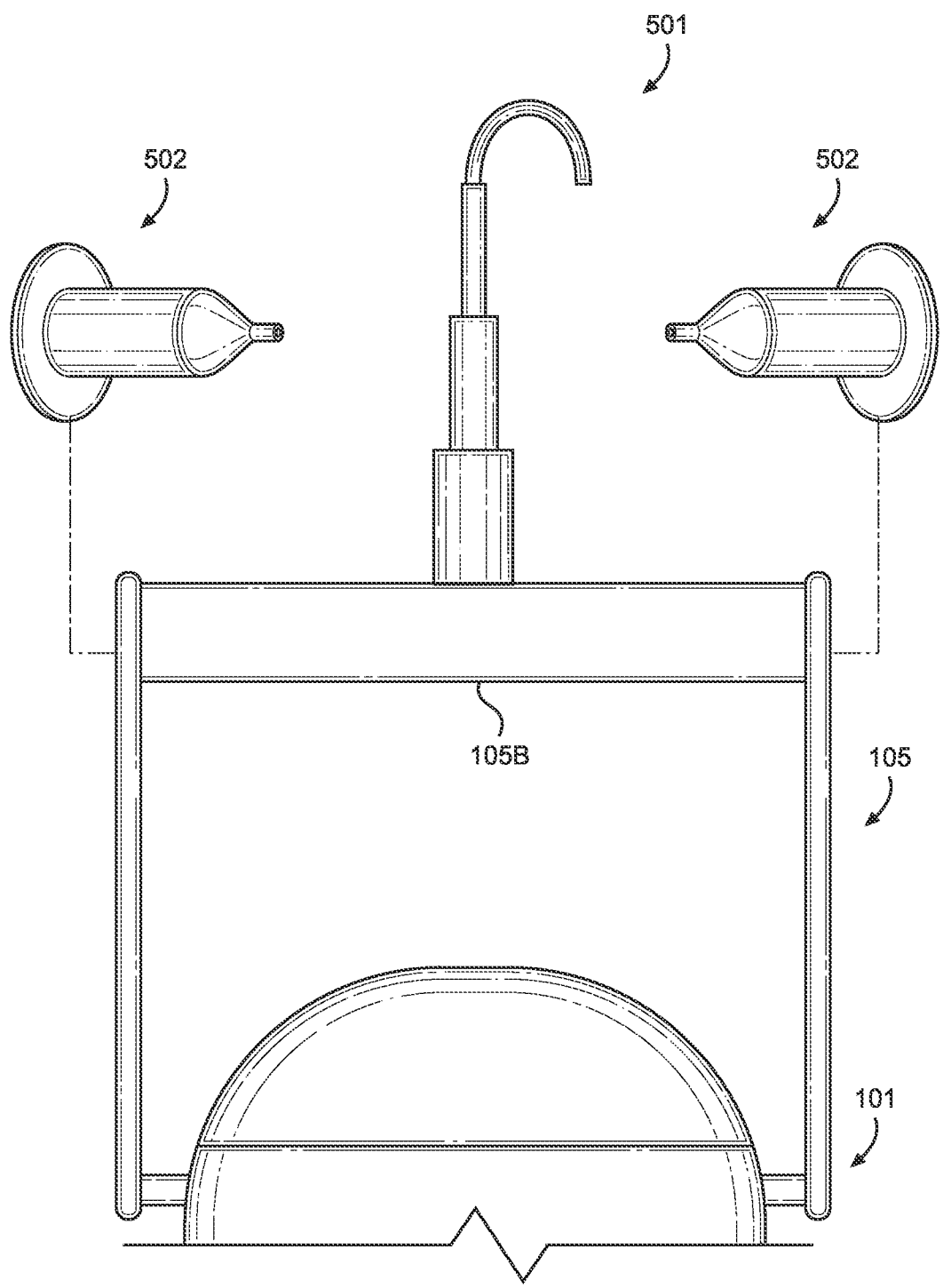
FIG. 5 shows a close-up view of an embodiment of the handle for the food warming device.

Referring now to FIG. 5, there is shown a close-up view of an embodiment of the handle for the food warming device. In one embodiment, the handle 105 of the container 101 includes a hook 501. The hook 501 will allow the food warming device to be secured and suspended away from a surface. In one embodiment, the hook 501 is a telescopic hook 501. This will allow for the food warming device to be suspended at a desired height to allow individuals to remove items from the container 101.

In one embodiment, the handle 105 of the container 101 includes a grasping portion 105B with an interior volume having opened ends. In one embodiment condiment containers 502 are removably secured in each open end of the grasping portion 105B. The condiment containers 502 are made from a flexible material which will allow for various condiments to be squeezed from the containers. In one embodiment, the condiment containers 502 are frictionally held within the handle 105. In another embodiment the condiment containers 502 are held in the handle 105 via a plurality of threads.

It is therefore submitted that the instant invention has been shown and described in what s considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A food warming device, consisting of:
a container having a base and at least one sidewall rising therefrom creating an interior volume;
a removable lid section secured to an end of the at least one sidewall opposite the base;
wherein the base, the at least one sidewall, and the removable lid include an insulative property;
a handle secured to the at least one sidewall adjacent to the removable lid;
further comprising a plurality of condiment containers removably secured within the handle;
wherein the condiment containers are made from a flexible material which will allow for various condiments to be squeezed from the containers;
further comprising a removable portion secured to the base of the container opposite the at least one sidewall;
further comprising a colander placed within the interior volume of the container;
further comprising a pair of tongs secured to the interior side of the removable lid; and
further comprising a pair of exterior side compartments secured to an exterior of the at least one sidewall.

2. The food warming device of claim 1, wherein the removable portion has a slot therein.

3. The food warming device of claim 1, wherein the handle has a collapsible hook secured thereto.

4. The food warming device of claim 1, wherein the container has a hotdog shape and the pair of exterior side compartments have a bun shape.

5. A food warming device, consisting of:
a container having a base and at least one sidewall rising therefrom creating an interior volume;
a removable lid section secured to an end of the at least one sidewall opposite the base;
wherein the base, the at least one sidewall, and the removable lid include an insulative property;
wherein the interior volume of the container is partially filled with a plurality of hot liquid;
a handle secured to the at least one sidewall adjacent to the removable lid;
further comprising a plurality of condiment containers removably secured within the handle;
wherein the condiment containers are made from a flexible material which will allow for various condiments to be squeezed from the containers;
further comprising a colander is placed within the interior volume of the container;
further comprising a pair of tongs secured to the interior side of the removable lid; and
further comprising a pair of exterior side compartments secured to the exterior of the at least one sidewall.

6. The food warming device of claim 5, further comprising a removable portion secured to the base of the container opposite the at least one sidewall.

7. The food warming device of claim 6, wherein the removable portion has a slot therein.

8. The food warming device of claim 5, wherein the handle has a collapsible hook secured thereto.

9. The food warming device of claim 5, wherein the container resembles a hotdog and the pair of exterior side compartments resemble a bun serving as a novelty item.

10. The food warming device of claim 5, wherein the hot liquid is water at least 180 degrees Fahrenheit.

* * * * *